US012102915B2

(12) United States Patent
Guo et al.

(10) Patent No.: US 12,102,915 B2
(45) Date of Patent: Oct. 1, 2024

(54) FRAME OVERLAY FOR DISPARITIES BETWEEN FRAMES OF A GAME STREAM

(71) Applicant: GOOGLE LLC, Mountain View, CA (US)

(72) Inventors: Kuangye Guo, Sunnyvale, CA (US); Erik F. Nelson, Sunnyvale, CA (US); Katherine Wu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 505 days.

(21) Appl. No.: 17/432,325

(22) PCT Filed: Mar. 18, 2020

(86) PCT No.: PCT/US2020/023258
§ 371 (c)(1),
(2) Date: Aug. 19, 2021

(87) PCT Pub. No.: WO2020/190996
PCT Pub. Date: Sep. 24, 2020

(65) Prior Publication Data
US 2022/0152494 A1    May 19, 2022

Related U.S. Application Data

(60) Provisional application No. 62/819,754, filed on Mar. 18, 2019, provisional application No. 62/947,448, filed on Dec. 12, 2019.

(51) Int. Cl.
*A63F 13/53* (2014.01)
*A63F 13/355* (2014.01)
*A63F 13/60* (2014.01)

(52) U.S. Cl.
CPC ............ *A63F 13/53* (2014.09); *A63F 13/355* (2014.09); *A63F 13/60* (2014.09); *A63F 2300/538* (2013.01); *A63F 2300/6692* (2013.01)

(58) Field of Classification Search
CPC ........ A63F 13/53; A63F 13/355; A63F 13/60; A63F 13/537; A63F 2300/538; A63F 2300/6692
See application file for complete search history.

(56) References Cited

U.S. PATENT DOCUMENTS 6,072,503 A * 6/2000 Tani .......................... G06T 1/00
345/473
9,349,201 B1    5/2016 Gault et al.
(Continued)

FOREIGN PATENT DOCUMENTS

EP    2750032 A2    7/2014

OTHER PUBLICATIONS

Communication pursuant to Article 94(3) EPC mailed Jun. 15, 2023 for EP Application No. 20718973.9, 11 pages.
(Continued)

*Primary Examiner* — Omkar A Deodhar
*Assistant Examiner* — Shuana-Kay Hall

(57) ABSTRACT

A client device of a game streaming system generates an overlay that identifies discontinuities and other changes in features between streamed frames. The client device receives a stream of frames, representing game content for display, from a server via a network. The client device analyzes the received frames to identify discontinuities and other changes in features of the plurality of frames, such as a particular feature changing one or more of position, size, texture, or other visual characteristic between successively received frames. The client device generates the overlay to
(Continued)

indicate the identified features and displays the overlay with at least one of the received frames.

24 Claims, 5 Drawing Sheets

(56) References Cited

U.S. PATENT DOCUMENTS

| | | |
|---|---|---|
| 2007/0013718 A1 | 1/2007 | Ohba |
| 2007/0019003 A1 | 1/2007 | Imai et al. |
| 2007/0265094 A1* | 11/2007 | Tone .................. G07F 17/3223 463/42 |
| 2014/0002670 A1* | 1/2014 | Kolarov ............... H04N 17/004 348/180 |
| 2014/0366057 A1* | 12/2014 | Brockmann ....... H04N 21/4316 725/37 |
| 2018/0236361 A1 | 8/2018 | Ninoles et al. |

OTHER PUBLICATIONS

Niklaus, Simon et al., "Context-aware Synthesis for Video Frame Interpolation", arXiv:1803.10967v1 [cs.CV] Mar. 29, 2018, http://graphics.cs. Pdx.edu/project/ctxsyn.

International Search Report and Written Opinion mailed Jun. 29, 2020 for corresponding International Application No. PCT/US2020/023258, 13 pages.

Gopinath M et al. "Motion Compensation With Prediction Error Using Ezw Wavelet Coefficients", Int. Journal of Engineering Research and Applications, ISSN: 2248-9622, vol. 6, Issue 5, (Part-6) May 2016, 4 pages.

Translation of Japanese Office Action mailed Apr. 4, 2023 for JP Application No. 2021-556634, 7 pages.

Translation of Japanese Office Action mailed Sep. 12, 2023 for JP Application No. 2021-556634, 6 pages.

International Preliminary Report on Patentability mailed Sep. 30, 2021 for PCT/US2020/023258, 9 pages.

* cited by examiner

FRAME OVERLAY FOR DISPARITIES BETWEEN FRAMES OF A GAME STREAM

CROSS-REFERENCE TO RELATED APPLICATIONS

The present application is a U.S. National Stage under 35 U.S.C. § 371 of International Patent Application Serial No. PCT/US2020/023258, entitled "FRAME OVERLAY FOR DISPARITIES BETWEEN FRAMES OF A GAME STREAM" and filed on 18 Mar. 2020, which claims priority to U.S. Provisional Application No. 62/819,754, entitled "SYSTEMS AND METHODS OF SMOOTHNESS VISUALIZATION" and filed on 18 Mar. 2019, and U.S. Provisional Application No. 62/947,448, entitled "SYSTEMS AND METHODS OF SMOOTHNESS VISUALIZATION" and filed on 12 Dec. 2019, the entireties of which are incorporated by reference herein.

BACKGROUND

Interactive video streaming systems stream video frames from a server to a client device over a network while allowing a user to interact with a virtual environment represented by the streamed video. For example, a game streaming system streams video frames representing a game environment while allowing the user to interact with the game environment via a game controller or other input device. The user manipulates the input device to interact with the game environment in a desired manner, and the client device transmits signaling representing the interaction to the server over the network. In response, the server changes a game state corresponding to the game environment and transmits video frames representing the game environment, and based on the new game state, to the client device via the network.

Because of the repeated transmissions of user inputs and resulting video frames, network performance can have a large impact on the user experience. For example, network transmission errors can cause transmission delays and dropped or lost video frames in the transmitted stream. These errors in turn can cause video stuttering, perceived game non-responsiveness, and other issues that negatively impact the user experience. Some game streaming systems address these issues by implementing ameliorative techniques such as frame interpolation and motion smoothing. However, the effectiveness of these ameliorative techniques often depends on identifying the particular features of the streamed frames that are most impacted by the transmission errors, and identifying these features is difficult using conventional techniques.

SUMMARY

The proposed solution in particular relates to a method comprising receiving a game stream comprising a plurality of frames for display, the plurality of frames including a first frame comprising a first graphical feature and a second frame comprising the first graphical feature; identifying a first difference between a first display characteristic of the first graphical feature associated with the first frame and a second display characteristic of the first graphical feature associated with the second frame; and applying an overlay to the first frame, the overlay including a first visual indicator indicating the first difference.

In an exemplary embodiment, the first display characteristic may comprise a first position of the first graphical feature and the second display characteristic comprises a second position of the first graphical feature, the second position different than the first position; and/or a first texture of the first graphical feature and the second display characteristic comprises a second texture of the first graphical feature, the second texture different than the first texture; and/or a first size of the first graphical feature and the second display characteristic comprises a second size of the first graphical feature, the second size different than the first size.

In addition or in the alternative, the method may further comprise including the first visual indicator with the first overlay in response to the first difference exceeding a threshold. For example, in some embodiments, the first graphical feature may have similar patterns in the first display characteristic, e.g., in the characteristic of a displayed pixels, such as a similar pattern of pixel color, intensity, pixel activity, or other characteristic, or any combination thereof. In some embodiments, a pair of first and second display characteristics between the first and second frames may be assigned a correspondence score based on a degree of similarity in the pattern of characteristics of the corresponding pixels, and features having a correspondence score equal to or above a (correspondence) threshold may be identified as displaying the same graphical feature. At the same time features not corresponding to each other (that is, features wherein the correspondence score is below a (correspondence) threshold) may be identified as differing by the first difference and exceeding a difference threshold.

In an exemplary embodiment, the first visual indicator may be based on a magnitude of the first difference. Color and/or texture of the first visual indicator may thus, for example, vary depending on the magnitude of the first difference.

In an exemplary embodiment, a characteristic of the visual indicator corresponds to a type of discontinuity associated with the first graphical feature.

Generally, the method may comprise applying an ameliorating technique for ameliorating effects of discontinuities between streamed frames based on the visual indicator. For example, the ameliorating technique comprises motion smoothing that blurs the first difference and/or frame interpolation for the game stream. In some embodiments, the degree and/or type of blurring may be determined on the basis of the visual indicator, e.g., on the basis of a type of visual indicator which may depend on whether the first difference relates to a difference in position, texture or size and/or on the basis of a magnitude of the visual indicator.

For example, motion smoothing can be improved by identifying how one or more graphical features have changed between the frames, such as the direction that a feature has moved, the distance that the feature has moved, any differences in the feature's texture, and the like, wherein such (first) difference are visualized by the visual indicator.

In an exemplary embodiment, the method may further comprise identifying a second difference between a third display characteristic of a second graphical feature associated with the first frame and a fourth display characteristic of the second graphical feature associated with the second frame, wherein the overlay includes a second visual indicator indicating the second difference, the second visual indicator different from the first visual indicator.

The proposed solution furthermore relates to a computer readable medium tangibly embodying a set of instructions that, when executed by a processor, manipulate the processor to receive a game stream comprising a plurality of frames for display, the plurality of frames including a first frame comprising a first graphical feature and a second frame comprising the first graphical feature;

identify a first difference between a first display characteristic of the first graphical feature associated with the first frame and a second display characteristic of the first graphical feature associated with the second frame; and apply an overlay to the first frame, the overlay including a first visual indicator indicating the first difference.

Further, the proposed solution relates to a game streaming system comprising a server for generating a stream of frames for a game stream and a client device for receiving the stream of frames, the client device being configured to receive the game stream comprising a plurality of frames for display, the plurality of frames including a first frame comprising a first graphical feature and a second frame comprising the first graphical feature;

identifying a first difference between a first display characteristic of the first graphical feature associated with the first frame and a second display characteristic of the first graphical feature associated with the second frame; and applying an overlay to the first frame, the overlay including a first visual indicator indicating the first difference.

The present disclosure in particular relates to techniques for generating an overlay that identifies discontinuities and other changes in features between streamed frames in a game streaming system. A client device of the game streaming system receives a stream of frames, representing game content for display, from a server via a network. The client device analyzes the received frames to identify discontinuities and other changes in features of the plurality of frames, such as a particular feature changing one or more of position, size, texture, or other visual characteristic between successively received frames. The client device generates the overlay to indicate the identified features and displays the overlay with at least one of the received frames. A user of the client device is thus able to quickly and easily identify features that are discontinuous between frames and can therefore quickly and easily adjust aspects of the game streaming system that address such discontinuities, thereby improving performance of the game streaming system.

To illustrate, in some embodiments the game streaming system can implement frame interpolation, motion smoothing, and similar techniques that hide or otherwise ameliorate the effects of discontinuities between streamed frames, such as can result from network transmission errors. The effectiveness of these techniques can be enhanced by identifying the particular features of a stream that are discontinuous between frames. For example, motion smoothing can be made more effective by identifying the particular object, texture, or other feature that experiences a discontinuity at the client device. However, because the streamed frames often have a large number of features, and the discontinuity in a feature can be small relative to the overall size of the streamed frames, it can be difficult to visually identify the particular features that are discontinuous between frames. By employing an overlay to visually highlight discontinuous features, the game streaming system allows a developer or other user of the system to quickly identify the discontinuous features and make corresponding adjustments to motion smoothing or other ameliorative techniques, thereby improving development and performance of the game streaming system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
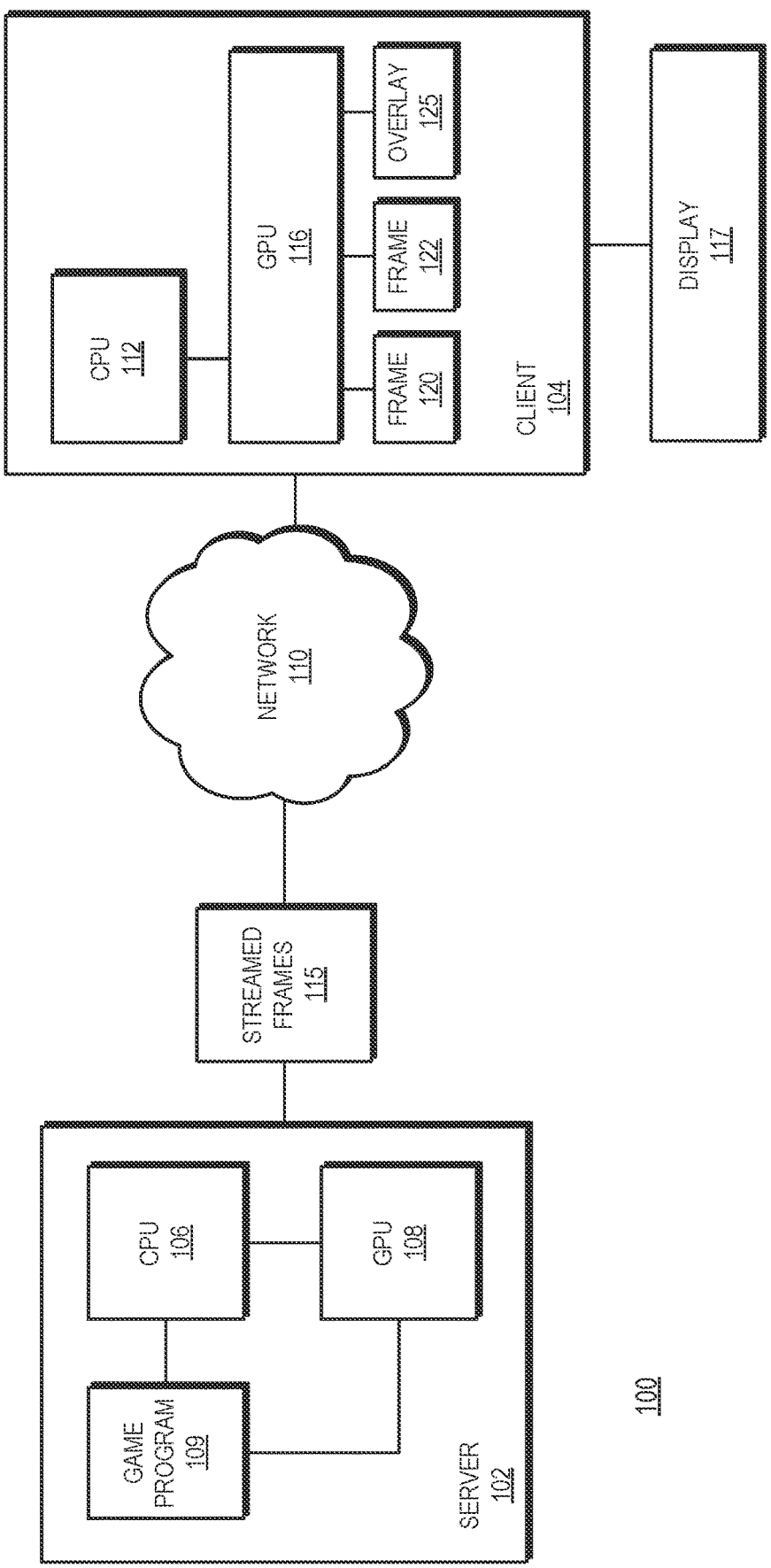
FIG. 1 is a block diagram of a game streaming system that generates a frame overlay that identifies discontinuities and other changes in features between frames in a game stream in accordance with some embodiments.

FIG. 1 illustrates a game streaming system 100 that is generally configured to stream rendered game content from a server 102 to a client device 104. In the depicted example, the server 102 and the client device 104 communicate via a network 110, wherein the network 110 is a packet-switched or other network that is generally configured to transfer data, including video data, via one or more routers, servers, communication towers (e.g. cellular communication towers), and the like, or any combination thereof. Accordingly, in various embodiments, the network 110 is a wide-area network (e.g., the Internet), a local-area network, and the like, or any combination thereof.

The server 102 and the client 104 are generally configured to collectively implement a streamed game session wherein interactive game content is streamed from the server 102 to the client device 104. Accordingly, the server 102 can be any type of computer device that implements the functionality described further herein, such as a rack-mounted server, a cluster server (i.e. a server device implemented in a cluster of server devices), a mobile server device, and the like, or a combination thereof. The client device 104 can be any computer device that can display video frames to a user and can receive user input, and therefore can be a desktop or laptop computer, a digital media player, a game console, a smartphone, a tablet, and the like.

To support streaming of game content to the client device during a streamed game session, the server 102 includes a plurality of processing units, such as a central processing unit (CPU) 106 and a graphics processing unit (GPU) 108.

The CPU 106 is a processing unit generally configured to execute general purpose sets of instructions, organized in the form of computer programs, to carry out tasks on behalf of the server 102. Examples of such computer programs include operating systems, virtual machines, data security programs (e.g. data encryption/decryption programs), web pages, database programs, and the like.

The GPU 108 is a processing unit generally configured to execute operations associated with graphics and vector processing based on commands received from the CPU 106. For example, in the course of executing one or more general purpose programs, the CPU 106 generates commands to generate and manipulate graphical models for display and provides the commands to the GPU 108. In response, the GPU 108 executes the commands by executing one or more corresponding graphical operations, thereby manipulating the graphical models to generate one or more frames for display. In some embodiments, the frames generated by the GPU 108 are rendered frames ready for display at a display device.

To support reception and display of streamed game content, the client device 104 includes a CPU 112 and a GPU 116. Each of these modules is analogous to the corresponding module of the server 102. Thus, for example, the CPU 112 is generally configured to execute general-purpose instructions on behalf of the client device 104, such as executing one or more of an operating system, a web browser, and the like. It will be appreciated that, in some embodiments, the CPU 112 and the GPU 116 generally have relatively small compute power relative to the CPU 106 and the GPU 108 of the server 120. The game streaming system 100 thus leverages the computing power of the server 102 to stream game content to the client 104 that is of higher quality than can be generated by the client device 104 alone.

In operation, the client 104 initiates a game streaming session in response to a user requesting the game session via a computer program (not shown) executed at the client 104, such as via a web browser, a dedicated game streaming program, a video streaming service program, and the like. In response to the user request, the CPU 112 sends a game session request via the network 110 to the server 102. In response, the server 102 initiates execution of a game program 109. In some embodiments, the server 102 is configured to execute any one of a library of game programs, and the request provided by the client 104 indicates the particular one of the game programs to be executed.

During execution, the game program 109 maintains a collection of data, referred to as a game state, that represents the condition, or state, of the game. A user of the client 104 employs a game controller or other input device to provide input data to the CPU 112, which communicates the input data to the game program 109 via the network 110. In response to the input data, the game program 109 modifies the game state according to the rules of the particular game implemented by the game program 109.

Based on the game state, and according to the rules of the implemented game, the game program 109 employs the CPU 106 and the GPU 108 to generate rendered frames, representing visual game information such as a virtual environment, a game board, a selection screen, a heads-up display (HUD) and the like, or any combination thereof. The server 102 provides these rendered frames, designated streamed frames 115, to the network 110 for communication to the client 104. The client device 104 receives at least a subset of the streamed frames 115 and employs the GPU 116 to display the received frames at a display 117. The client device 104 thus displays the visual game information to the user who, in response, uses the game controller or other input device to provide further input data, resulting in further changes to the game state maintained by the game program 109 and corresponding changes to frames of the frame stream 115. In this way, the user of the client device 104 interacts with the game program 109 to play the game executed at the server 102.

In some cases, transmission errors or other errors in the network 110 can cause one or more frames of the streamed frames 115 to not be received, or to be received in a corrupted fashion so that it is not displayable, at the client 104. Such frames are referred to herein as "dropped" frames. Dropped frames can cause jumps, stutters, and other visual discontinuities that can negatively impact the user experience with the game program 109. In some cases, the game program 109 can apply graphical effects to the streamed frames 115, as the frames are being generated, to address the effects of dropped frames, such as by rendering any discontinuities between frames less perceptible to a user. For example, the game program 109 can apply motion smoothing that blurs differences between a series of frames of the streamed frames 115, so that any discontinuities are less visible to the user. In some embodiments, these remedial graphical effects are applied, in whole or in part, by a program executing at the client 104.

In some cases, the remedial graphical effects can be improved by identifying characteristics of the particular discontinuities between frames displayed by the client 104. For example, motion smoothing can be improved by identifying how one or more graphical features have changed between the frames, such as the direction that a feature has moved, the distance that the feature has moved, any differences in the feature's texture, and the like. Accordingly, during development or execution of the game program 109, it is often useful to visually identify discontinuities between frames displayed by the client 104 so that a developer or user can implement corresponding adjustments to the remedial graphical effects implemented by the game program 109. However, the discontinuities in a feature between displayed frames may be small relative to the overall size of the displayed frame, and therefore difficult for the user or developer to identify visually. Accordingly, to assist the user or developer with identifying discontinuities between displayed frames, the GPU 116 is configured to generate an overlay 125 that provides a visible indicator of discontinuities between displayed frames.

For example, in some embodiments the GPU 116 is configured to analyze each of two successively received frames (e.g., frames 120 and 122). In some cases, the frames 120 and 122 correspond to non-consecutive frames in the streamed frames 115, because one or more of the streamed frames 115 have been dropped during transmission via the network 110. The GPU 116 identifies visual features in each of the frames 120 and 122, and further identifies correspondences between the visual features. For example, in some embodiments the GPU 116 analyzes characteristics of the pixels of each frame and identifies features based on patterns of characteristics of the pixels, such as patterns in the color, intensity, pixel activity, or other characteristics of one or more subsets of the pixels, or any combination of these characteristics. For example, in some cases the GPU 116 identifies a feature of the frame 120 based on the color of a subset of the frame's pixels having a specified pattern, such as a color pattern indicative of an object's edge, corner, or other visual feature. In some embodiments, the server 102 provides metadata with the streamed frames 115 identifying expected features of each streamed frame, and the GPU 116 employs the metadata instead of or in addition to analyzing the received frames in order to identify features in each frame.

After or concurrent with identifying one or more features in each of the frames 120 and 122, the GPU 116 identifies correspondences between the features. For example, in some embodiments the GPU 116 identifies features of the frames 120 and 122 that have similar patterns in the characteristics of the corresponding pixels, such as a similar pattern of pixel color, intensity, pixel activity, or other characteristic, or any combination thereof. In some embodiments, assigns each pair of features between the frames 120 and 122 a correspondence score based on a degree of similarity in the pattern of characteristics of the corresponding pixels, and identifies features having a correspondence score above a threshold as being the same feature.

In response to identifying the same feature in both frame 120 and 122, the GPU 116 identifies any discontinuities between the feature in the frames 120 and 122. As used herein, a discontinuity can be any difference, or combination of differences, between a feature identified in at least a pair of frames, such as a difference in the position of the feature in each frame, a difference in the color of one or more pixels of the feature in each frame, a difference in the graphical texture of the feature in each frame, and the like.

The GPU 116 generates the overlay 125 to have a visual indicator of each identified feature and to indicate any discontinuities in the feature between the frame 120 and 122. In some embodiments, the size of the overlay 125 corresponds to the size of the frames 120 and 122, and the GPU 116 positions the visual indicator for a feature so that the indicator is positioned at or near corresponding feature's location in one of the frame 122, so that when the overlay and the frame 122 are displayed together, the visual indicator visibly highlights the corresponding feature. In some embodiments, the GPU 116 selects the visual indicator for a feature based on one or more of the identified discontinuities for the feature. For example, in some embodiments the size, shape, or color, or a combination thereof, of the visual indicator indicates a magnitude of the corresponding discontinuity. Thus, for example, in some cases a larger visual indicator indicates a greater positional discontinuity associated with the feature.

Further, in some embodiments different characteristics of the visual indicator correspond to different types of discontinuity associated with the feature. Thus, for example, in some embodiments the size of the visual indicator indicates the magnitude of a positional discontinuity associated with the feature (that is, the amount of positional difference in the feature between the frames 120 and 122), while the color of the visual indicator indicates whether there is a textural discontinuity between the feature (e.g., white indicating no textural difference in the feature between the frames 120 and 122 and red indicating a textural difference).

In some embodiments, the GPU 116 composites the frame 122 and the overlay 125 into a single frame for display at the display 117. Accordingly, when the composite frame is displayed, the visual indicators of the overlay 125 visibly indicate discontinuities between features of the frames 120 and 122, even when those discontinuities are themselves difficult or impossible to see with the naked eye. The user of the client device 104 can make adjustments based on the identified discontinuities, such as adjustments to the display settings of the display 117, to settings of the GPU 116 or a game client program (not shown) executing at the client 104, to settings of the game program 109, and the like, or any combination thereof. For example, the user can adjust one or more motion smoothing settings of the game program 109 to adjust how a motion smoothing portion of the program behaves to better address the identified discontinuities and improve the overall game experience at the client device 104.

Figure 2:
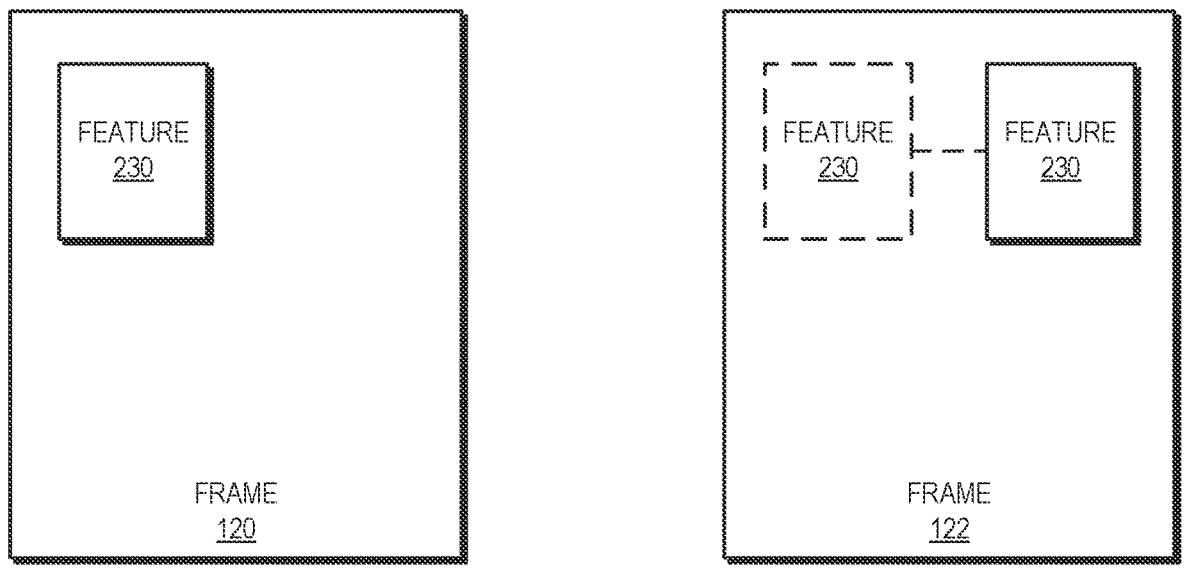
FIG. 2 is a diagram illustrating an example of a discontinuity of a feature between frames of the game stream at the game streaming system of FIG. 1 in accordance with some embodiments.

FIG. 2 illustrates an example of a discontinuity in a feature 230 between the frames 120 and 122 in accordance with some embodiments. In the depicted example, the feature 230 is at one position in frame 120 but is at a different position in frame 122, and in particular is shifted to the right. Thus, FIG. 2 illustrates a positional discontinuity for the feature 230. The feature 230 therefore can be any visual feature that can change positions between frames, such as a corner of an object, and edge of an object, a particular textural feature of an object, a portion of an object having a particular characteristic, such as a particular shape, color, texture, or combination thereof, and the like.

It will be appreciated that while FIG. 2 illustrates a positional discontinuity associated with the feature 230, in other embodiments the feature 230 can have other discontinuities. These other discontinuities can be instead of or in addition to the positional discontinuity illustrated at FIG.2 and can be in any combination. For example, the feature 230 can be a different translational position, a different rotational position, have a different texture, a different color, and the like, or any combination thereof.

Figure 3:
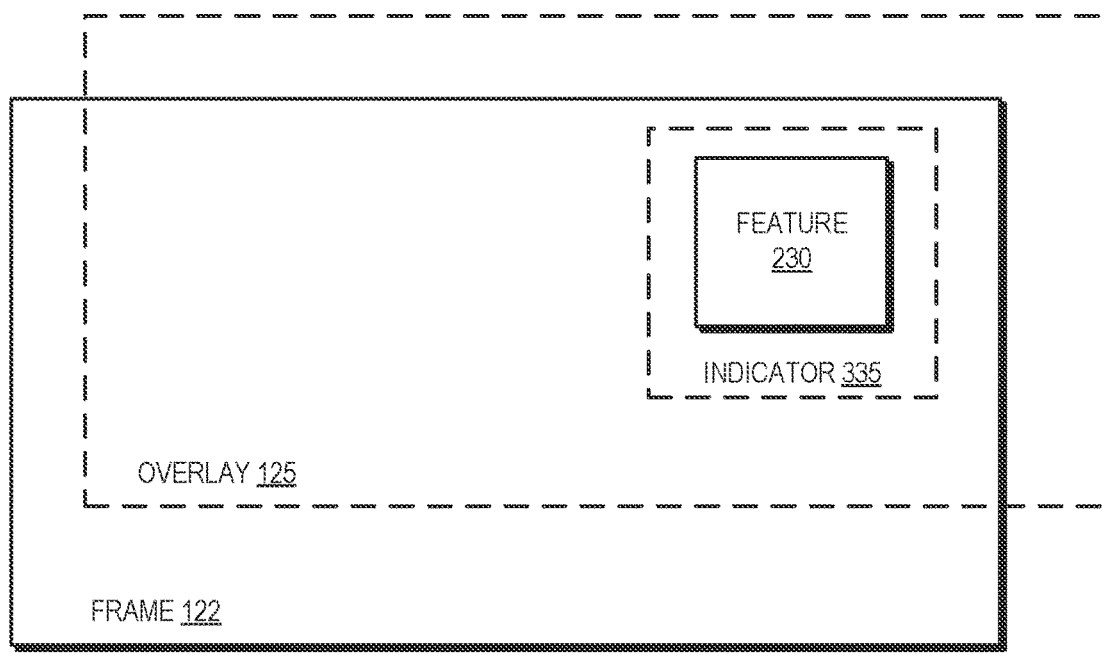
FIG. 3 is a diagram illustrating an example of the overlay of FIG. 1 identifying a feature discontinuity in a frame in accordance with some embodiments.

FIG. 3 illustrates an example of the overlay 125 providing a visual indicator 335 for the feature 230 in accordance with some embodiments. In the depicted example, the overlay 125 is illustrated with a dashed outline, and is depicted as slightly offset from the frame 122 in order to differentiate the overlay from the frame. However, it will be appreciated that the GPU 116 can composite the overlay 125 with the frame 122 for display, so that the frame 122 and overlay 125 are effectively displayed together at the display 117. In particular, the indicator 335 is displayed over or near the feature 230 to provide a visual indicator of the associated discontinuity.

In different embodiments the indicator 335 is a color, shape, texture, informational text, icon, or other visual indicator, or combination thereof, that indicates one or more of the type of discontinuity associated with the feature 230, the magnitude of the discontinuity, a specified characteristic of the discontinuity (e.g., a spatial direction associated with a positional discontinuity), and the like, or any combination thereof. For example, in the case of a positional discontinuity, the indicator 335 can be a line or arrow indicating the size and direction of the positional discontinuity.

Figure 4:
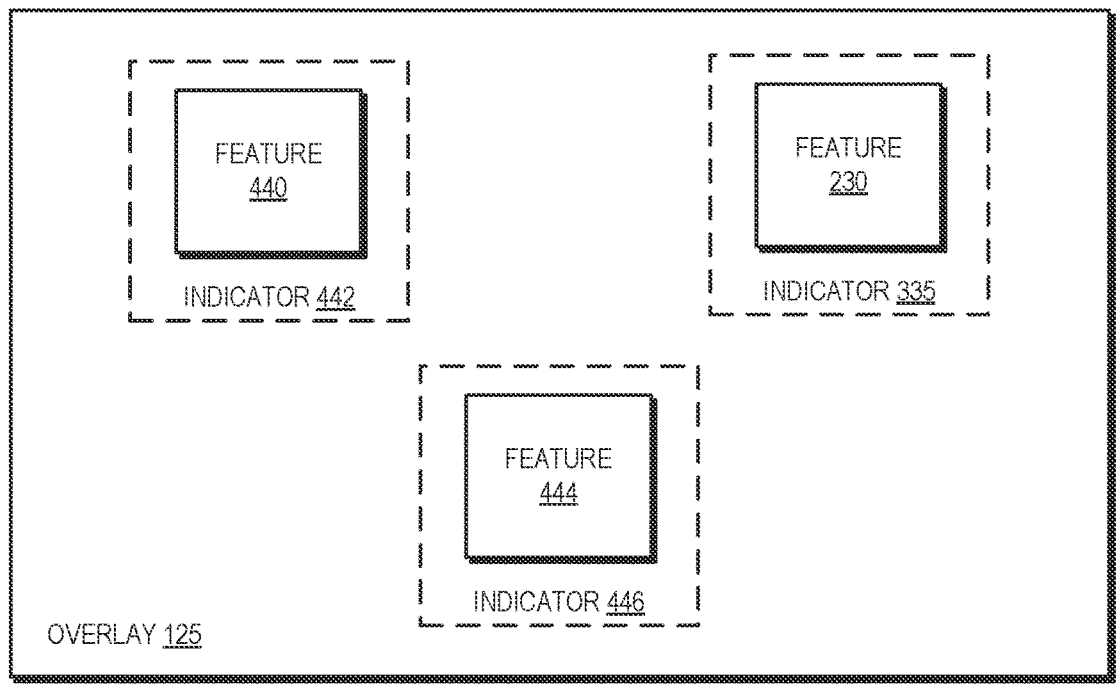
FIG. 4 is a diagram illustrating an example of the overlay of FIG. 1 identifying discontinuities of multiple features in a frame in accordance with some embodiments.

In some cases, multiple features of the frames 120 and 122 have discontinuities between the frames. For example, in some cases multiple features of the frames 120 and 122 will shift positions between the frames. In some embodiments, the GPU 116 generates the overlay 125 to include a visual indicator for each discontinuity between the frames 120 and 122. An example is illustrated at FIG. 4 in accordance with some embodiments. In the depicted example, the overlay 125 includes visual indicators 335, 442, and 446, each of which visually indicates a discontinuity associated with a corresponding feature, designated features 230, 440, and 444. In some embodiments, each of the features 230, 440, and 444 is a different type of feature identified by the GPU 116 in the frames 120 and 122. For example, in some embodiments the feature 230 is an edge of an object, the feature 440 is a corner of the same object, and the feature 444 is a portion of a different object with an identified texture. In other embodiments, one or more of the features 230, 440, and 440 are features of the same type, such as an edge or corner of an object.

The type of each visual indicator 335, 442, and 446 depends on the type of discontinuity associated with the corresponding feature. Accordingly, each visual indicator 335, 442, and 446 can have different characteristics, such as a different size, color, shape, orientation, textual information, icon, and the like, or a combination thereof, that visually indicate the type of discontinuity associated with the corresponding feature. For example, in some embodiments, the visual indicator 335 is of a red color, to indicate that the feature 230 has a positional discontinuity, while the visual indicator 442 has a red color to indicate that the feature 440 has a textural discontinuity. In other embodiments, the visual indicator 442 has a "X" shape to indicate a color discontinuity for the feature 440, while the visual indicator 444 has a "plus" shape to indicate a rotational discontinuity for the feature 444.

In some embodiments, the type of visual indicator, or a characteristic thereof, such as the size, color, or shape of the visual indicator, indicates a magnitude of the associated discontinuity. For example, in some embodiments, a larger visual indicator indicates a larger discontinuity than a smaller visual indicator. In other embodiments, a visual indicator of one specified color indicates a larger discontinuity than a visual indicator of a different specified color. Thus, in the example of FIG. 4, the overlay 125 includes visual indicators for multiple feature discontinuities, where each visual indicator can indicate a type, magnitude, and other characteristics of the associated discontinuity.

Figure 5:
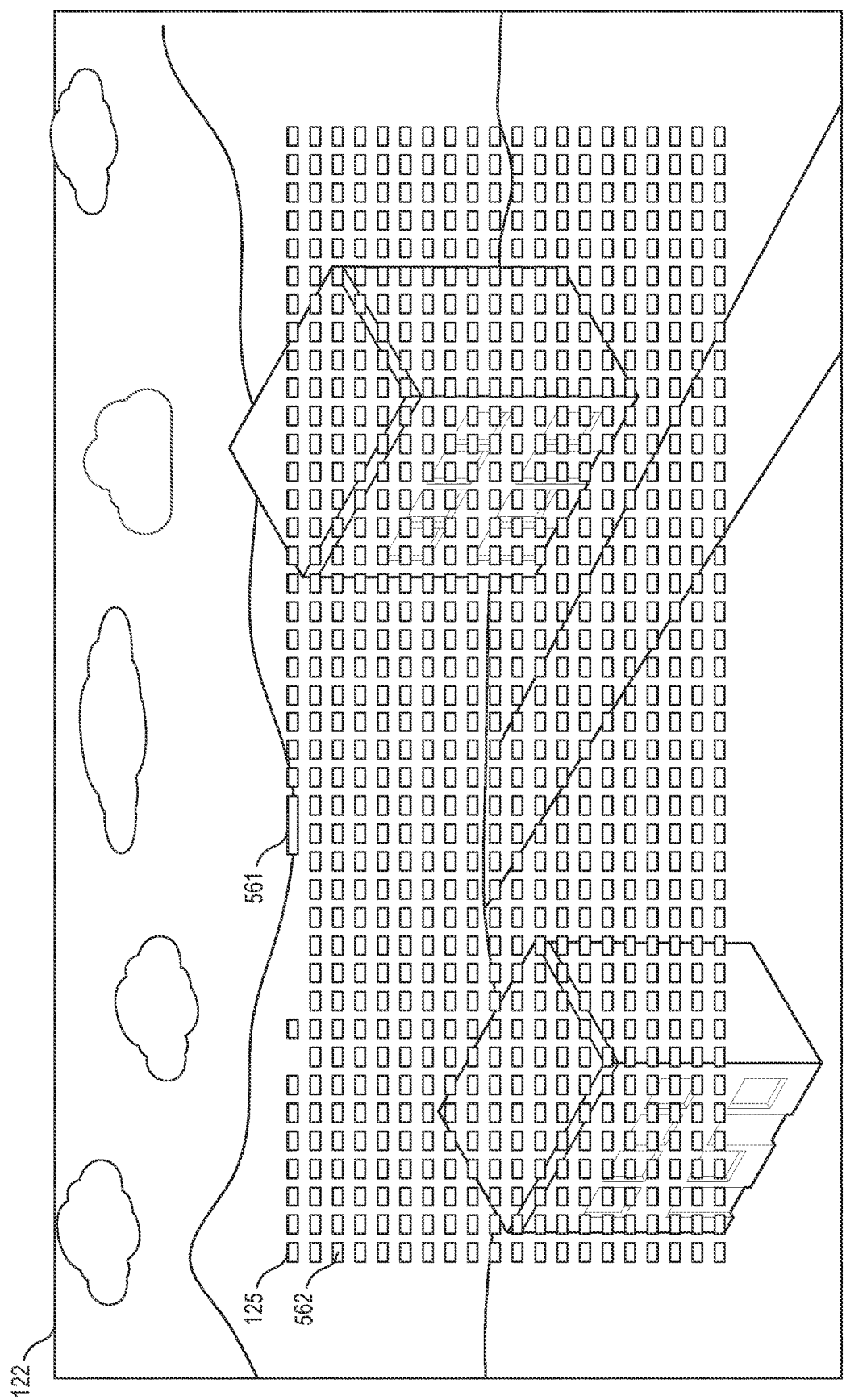
FIG. 5 is a diagram illustrating another example of the overlay of FIG. 1 identifying discontinuities of features in accordance with some embodiments.

FIG. 5 illustrates another example of the overlay 125 composited with the frame 122 in accordance with some embodiments. In the example of FIG. 5, the overlay 125 includes visual indicators in the shape of rectangles, with each rectangle indicating a discontinuity in a feature of the frame 122 at or near the corresponding rectangle. The size of the rectangle indicates the magnitude of the corresponding discontinuity. For example, the visual indicator 561 is larger than visual indicator 562, indicating that the discontinuity associated with visual indicator 561 has a greater magnitude than the discontinuity associated with visual indicator 562. The user of the overlay 125 can therefore quickly identify the features having the largest discontinuities, and in response adjust one or more aspects of the game program 109 to address the largest discontinuities, such as by changing characteristics of motion blur, frame interpolation, and the like, or a combination thereof.

Figure 6:
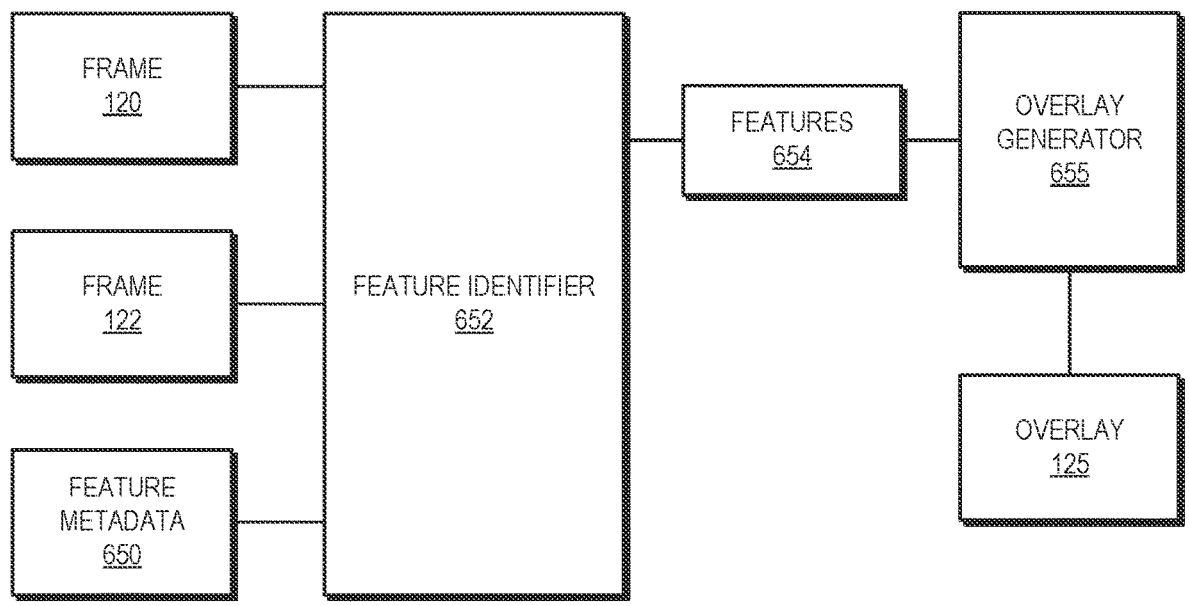
FIG. 6 is a block diagram illustrating an overlay generator that generates the overlay of FIG. 1 in accordance with some embodiments.

FIG. 6 is a block diagram of a system to generate the overlay 125 including a feature identifier 652 and an overlay generator 655 in accordance with some embodiments. In some embodiments, the feature identifier 652 and the overlay generator 655 are software modules executed at one or more of the CPU 112 and the GPU 116 of the client device 104. In other embodiments, one or more aspects of the feature identifier 652 and the overlay generator 655 is implemented by dedicated hardware of the client device 104.

The feature identifier 652 is configured to analyze the frames 120 and 122 to identify features included in each frame, to identify correspondences between the features, and to store the identified features and correspondences in a data structure designated features 654. To identify the features, the feature identifier 652 executes one or more feature identification processes, such as edge detection, corner detection, blob detection, ridge detection, texture detection, and the like, or any combination thereof. In addition, in the example of FIG. 6, the feature detector receives feature metadata 650 from the server 102 (FIG. 1) that identifies, or provides hints to identify, one or more features of the frames 120 and 122. In some embodiments, the game program 109 generates the feature metadata during generation of frames for the streamed frames 115 based on object data associated with the game state. For example, in some embodiments the game program 109 determines the position, texture, and other specified characteristics of objects in a frame based up the game state, thereby creating a visual representation of the game state, such as one or more of a virtual environment, player character, game information overlay, and the like. The game program 106 can store the positional, texture, and other characteristic information for one or more of the objects at the feature metadata 650. The feature identifier 652 can use the stored information to assist in feature detection, such as by assuming a feature exists for each object represented by the feature metadata 650, by using the object characteristic information to identify edges, corners, and textures, and the like.

After identifying one or more features in each of the frames 120 and 122, the feature identifier 650 determines correspondences between the features. That is, the feature identifier 650 determines which features of frame 122 correspond to which features of frame 120. The feature identifier 650 determines the correspondence between features based on, for example, similar patterns in the characteristics of the corresponding pixels of each feature in a pair of features, such as a similar pattern of pixel color, intensity, pixel activity, or other characteristic, or any combination thereof. In some embodiments, the feature identifier 650 identifies correspondences between features only if those features are within a same region of each frame, thereby simplifying the correspondence identification.

To identify whether a given feature of frame 120 corresponds to a given feature of frame 122, the feature identifier 650 assigns each of the pair of features a correspondence score that indicates a degree of similarity in the pattern of characteristics of the corresponding pixels. The correspondence score can be based on any of a variety of factors, such as similarity in pixel colors, pixel activity, pixel intensities, patterns of pixel colors or intensity, and the like. The feature identifier 650 identifies features having a correspondence score above a threshold as being corresponding features.

The overlay generator 655 receives the features 654 from the feature identifier 650. For each set of corresponding features indicated by the features 654, the overlay generator determines any discontinuities between the corresponding features, such as differences in translational position, rotational position, color, texture, and the like. The overlay generator 655 generates the overlay 125 to have a visual indicator of each identified feature of the features 654 that indicates the discontinuities associated with the feature, as described herein.

Figure 7:
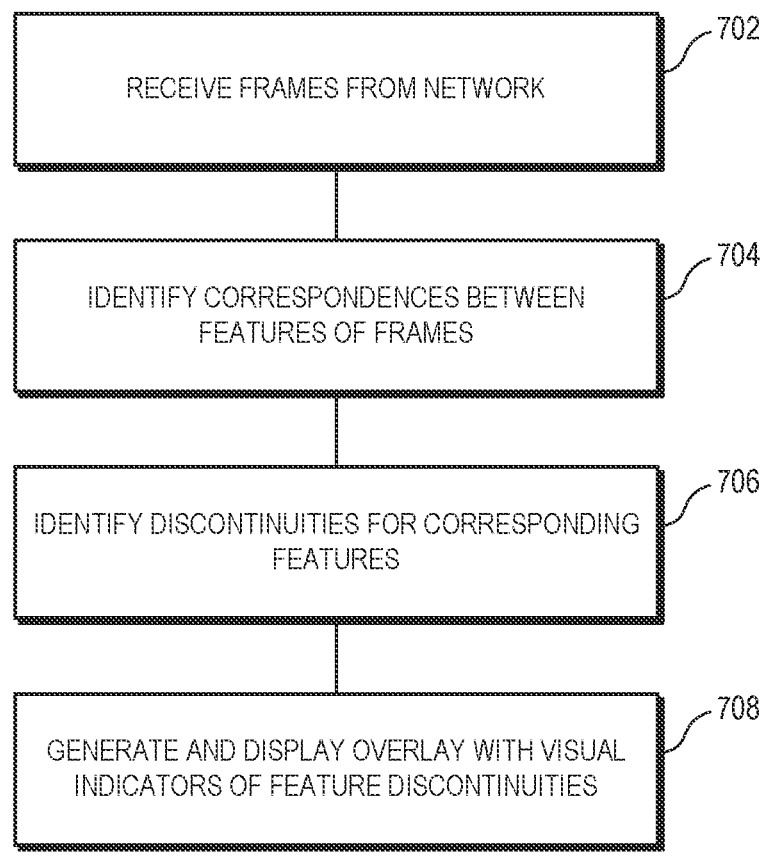
FIG. 7 is a flow diagram illustrating a method of generating an overlay that identifies discontinuities of features between frames of a game stream in accordance with some embodiments.

FIG. 7 illustrates a flow diagram of a method 700 of generating an overlay with visual indicators between received frames of a game stream in accordance with some embodiments. For purposes of description, the method 700 is described with respect to an example implementation at the game streaming system 100 of FIG. 1. At block 702, the client device 104 receives at least some of the frames of the streamed frames 115, including frames 120 and 122. At block 704, the GPU 116 identifies features in each of the frames 120 and 122 and identifies correspondences between the features. At block 706, the GPU 116 identifies any discontinuities between the corresponding features. At block 708, the GPU 116 generates the overlay 125 including visual indicators for the discontinuities identified at block 706. The GPU 116 composites the overlay 125 with the frame 122 and sends the composited frame to the display device 117 for display, thereby allowing a user to quickly and visually identify discontinuities in the received frames.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving a video stream comprising a plurality of frames for display, the plurality of frames including a first frame comprising a first graphical feature and a second frame comprising the first graphical feature;
    identifying a first difference between a first display characteristic of the first graphical feature associated with the first frame and a second display characteristic of the first graphical feature associated with the second frame; and
    applying an overlay to the first frame, the overlay including a first visual indicator indicating the first difference.

2. The method of claim 1, wherein the first display characteristic comprises a first position of the first graphical feature and the second display characteristic comprises a second position of the first graphical feature, the second position different than the first position.

3. The method of claim 1, wherein the first display characteristic comprises a first texture of the first graphical feature and the second display characteristic comprises a second texture of the first graphical feature, the second texture different than the first texture.

4. The method of claim 1, wherein the first display characteristic comprises a first size of the first graphical feature and the second display characteristic comprises a second size of the first graphical feature, the second size different than the first size.

5. The method of claim 1, further comprising:
    including the first visual indicator with the overlay in response to the first difference exceeding a threshold.

6. The method of claim 1, wherein the first visual indicator is based on a magnitude of the first difference.

7. The method of claim 1, wherein the first visual indicator comprises a color.

8. The method of claim 1, wherein the first visual indicator comprises a texture.

9. The method of claim 1, wherein a characteristic of the visual indicator corresponds to a type of discontinuity associated with the first graphical feature and resulting from one or more frames not received at a client device due to a network transmission error in transmitting the stream to the client device.

10. The method of claim 1, further comprising:
    applying an ameliorating technique for ameliorating effects of discontinuities between streamed frames based on the visual indicator.

11. The method of claim 10, wherein the ameliorating technique comprises one of motion smoothing that blurs the first difference and frame interpolation for the video stream.

12. The method of claim 1, further comprising:
    identifying a second difference between a third display characteristic of a second graphical feature associated with the first frame and a fourth display characteristic of the second graphical feature associated with the second frame; and
    wherein the overlay includes a second visual indicator indicating the second difference, the second visual indicator different from the first visual indicator.

13. A method, comprising:
- identifying a difference between a graphical feature for display in a first frame of a video stream and an aspect of the graphical feature for display in a second frame of the video stream; and
- applying an overlay to the first frame, the overlay indicating the difference.

14. The method of claim 13, wherein the difference comprises at least one of a position, texture, and size of the graphical feature.

15. A non-transitory computer readable medium tangibly embodying a set of instructions that, when executed by a processor, manipulate the processor to:
- receive a video stream comprising a plurality of frames for display, the plurality of frames including a first frame comprising a first graphical feature and a second frame comprising the first graphical feature;
- identify a first difference between a first display characteristic of the first graphical feature associated with the first frame and a second display characteristic of the first graphical feature associated with the second frame; and
- apply an overlay to the first frame, the overlay including a first visual indicator indicating the first difference.

16. The non-transitory computer readable medium of claim 15, wherein the first display characteristic comprises a first position of the first graphical feature and the second display characteristic comprises a second position of the first graphical feature, the second position different than the first position.

17. The non-transitory computer readable medium of claim 15, wherein the first display characteristic comprises a first texture of the first graphical feature and the second display characteristic comprises a second texture of the first graphical feature, the second texture different than the first texture.

18. The non-transitory computer readable medium of claim 15, wherein the first display characteristic comprises a first size of the first graphical feature and the second display characteristic comprises a second size of the first graphical feature, the second size different than the first size.

19. The non-transitory computer readable medium of claim 15, wherein the set of instructions further comprise instructions to:
- include the first visual indicator with the overlay in response to the first difference exceeding a threshold.

20. The non-transitory computer readable medium of claim 15, wherein the first visual indicator is based on a magnitude of the first difference.

21. The non-transitory computer readable medium of claim 15, wherein the first visual indicator comprises a color.

22. The non-transitory computer readable medium of claim 15, wherein the first visual indicator comprises a texture.

23. The non-transitory computer readable medium of claim 15, wherein the set of instructions further comprise instructions to:
- identify a second difference between a third display characteristic of a second graphical feature associated with the first frame and a fourth display characteristic of the second graphical feature associated with the second frame; and
- wherein the overlay includes a second visual indicator indicating the second difference, the second visual indicator different from the first visual indicator.

24. A video streaming system comprising a server for generating a stream of frames for a video stream and a client device for receiving the stream of frames, the client device being configured to:
- receive the video stream comprising a plurality of frames for display, the plurality of frames including a first frame comprising a first graphical feature and a second frame comprising the first graphical feature;
- identifying a first difference between a first display characteristic of the first graphical feature associated with the first frame and a second display characteristic of the first graphical feature associated with the second frame; and
- applying an overlay to the first frame, the overlay including a first visual indicator indicating the first difference.

* * * * *